(12) United States Patent
Braun

(10) Patent No.: US 11,336,813 B2
(45) Date of Patent: May 17, 2022

(54) METHOD AND DEVICE FOR SYNCHRONIZING A DIGITAL PHOTOGRAPHY CAMERA WITH ALTERNATIVE IMAGE CONTENT SHOWN ON A PHYSICAL DISPLAY

(71) Applicant: Appario Global Solutions (AGS) AG, Baar (CH)

(72) Inventor: Max Von Braun, Weilheim (DE)

(73) Assignee: APPARIO GLOBAL SOLUTIONS (AGS) AG, Baar (CH)

( * ) Notice: Subject to any disclaimer, the term of this patent is extended or adjusted under 35 U.S.C. 154(b) by 0 days.

(21) Appl. No.: 17/273,517

(22) PCT Filed: Sep. 13, 2019

(86) PCT No.: PCT/EP2019/074543
§ 371 (c)(1),
(2) Date: Mar. 5, 2021

(87) PCT Pub. No.: WO2020/053416
PCT Pub. Date: Mar. 19, 2020

(65) Prior Publication Data
US 2021/0321032 A1    Oct. 14, 2021

(30) Foreign Application Priority Data
Sep. 13, 2018 (EP) .................................. 18194374

(51) Int. Cl.
*H04N 5/232* (2006.01)
*H04N 21/414* (2011.01)
(Continued)

(52) U.S. Cl.
CPC ... *H04N 5/23206* (2013.01); *H04N 21/41415* (2013.01); *H04N 21/4223* (2013.01); *H04N 21/4302* (2013.01); *H04N 21/812* (2013.01)

(58) Field of Classification Search
CPC .. H04N 5/23206; H04N 5/2353; H04N 5/232; H04N 21/4302; H04N 21/812; H04N 21/4223; H04N 21/41415
See application file for complete search history.

(56) References Cited

U.S. PATENT DOCUMENTS 9,264,598 B1 * 2/2016 Baldwin ............ H04N 5/23206
11,025,892 B1 * 6/2021 Aman ..................... A63F 13/69
(Continued)

FOREIGN PATENT DOCUMENTS

| JP | 2008097191 | 4/2008 |
| WO | 98/18261 | 4/1998 |
| WO | 2018/138366 | 8/2018 |

OTHER PUBLICATIONS

International Search Report for International Application No. PCT/EP2019/074543, dated Dec. 4, 2019, 3 pages.

*Primary Examiner* — Jefferey F Harold
*Assistant Examiner* — Timothy R Newlin
(74) *Attorney, Agent, or Firm* — Day Pitney LLP; George N. Chaclas

(57) ABSTRACT

The present invention concerns a method and device for synchronizing a digital photography camera with alternative image content shown on a physical display, comprising: generating at least two different sets of image data, each set of image data comprising a sequence of individual images; generating a master-clock signal (M); displaying the images of said at least two sets of image data in a time-sliced multiplexed manner on said physical display triggered by said master-clock signal, generating a camera-synchronization signal (C) on the basis of said master-clock signal (M), generating a camera-actuation signal (A) for capturing at least one image with said digital photography camera; generating at least one shutter release signal (S) for said digital photography camera on the basis of said camera-synchronization signal (C) and said camera-actuation signal (A); and transmitting said at least one shutter release signal (S) to a shutter control unit of said digital photography camera.

12 Claims, 3 Drawing Sheets

(51) Int. Cl.
*H04N 21/4223* (2011.01)
*H04N 21/43* (2011.01)
*H04N 21/81* (2011.01)

(56) References Cited

U.S. PATENT DOCUMENTS

| | | | |
|---|---|---|---|
| 2003/0197794 A1* | 10/2003 | Sakata | H04N 7/147 |
| | | | 348/222.1 |
| 2004/0194127 A1* | 9/2004 | Patton | H04N 21/44012 |
| | | | 725/32 |
| 2006/0026628 A1* | 2/2006 | Wan | H04N 21/8456 |
| | | | 725/32 |
| 2011/0267439 A1* | 11/2011 | Chen | G02B 30/25 |
| | | | 348/53 |
| 2015/0015743 A1* | 1/2015 | Rantalainen | H04N 5/272 |
| | | | 348/239 |
| 2016/0028968 A1* | 1/2016 | Affaticati | G06T 7/174 |
| | | | 348/47 |
| 2017/0098228 A1* | 4/2017 | Braun | H04W 4/02 |
| 2018/0176441 A1* | 6/2018 | Burgess | B64D 47/08 |
| 2020/0177943 A1* | 6/2020 | Dangler | H04N 21/23418 |
| 2021/0144449 A1* | 5/2021 | Cruz Moya | G06Q 30/0205 |
| 2021/0227270 A1* | 7/2021 | Braun | H04N 21/2187 |
| 2021/0321032 A1* | 10/2021 | Braun | H04N 5/2353 |

* cited by examiner

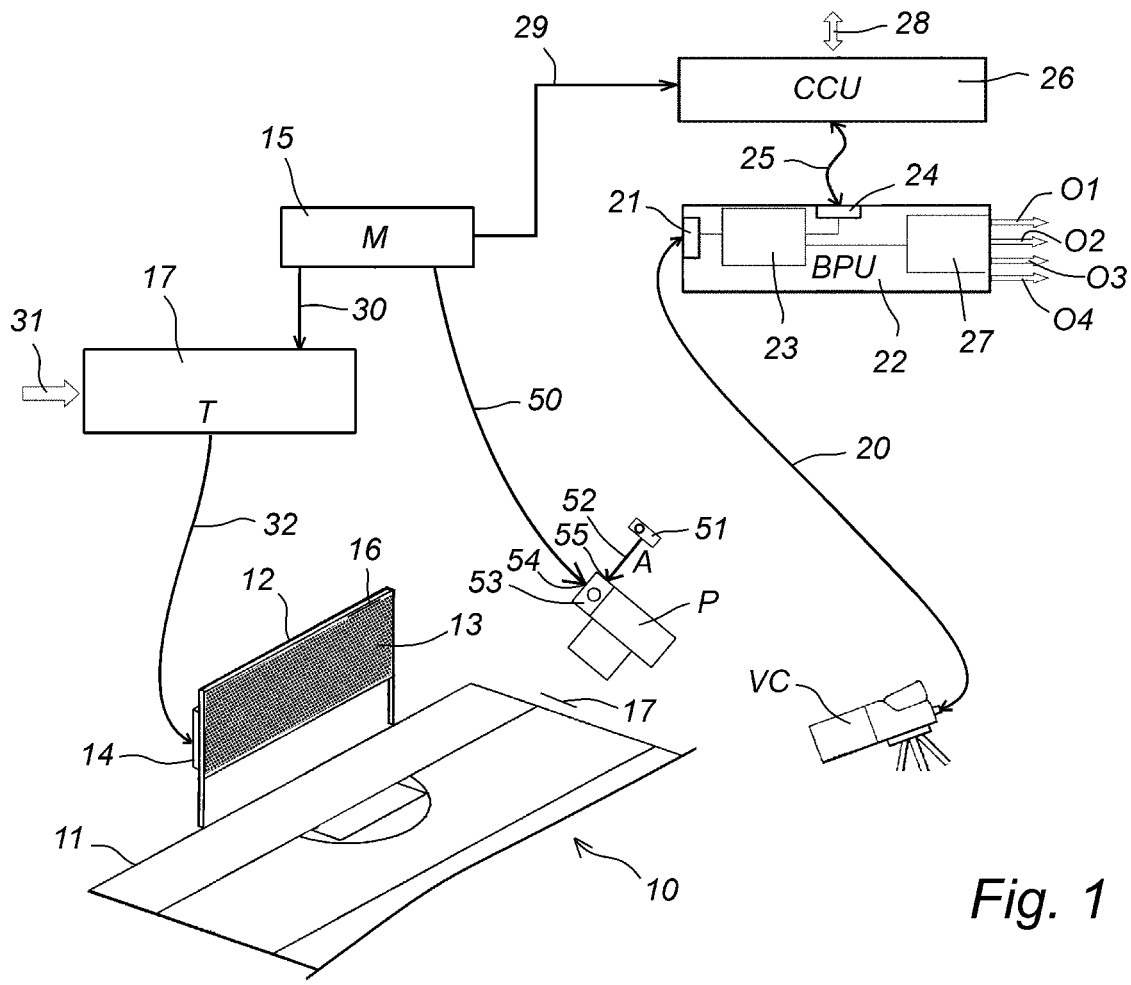
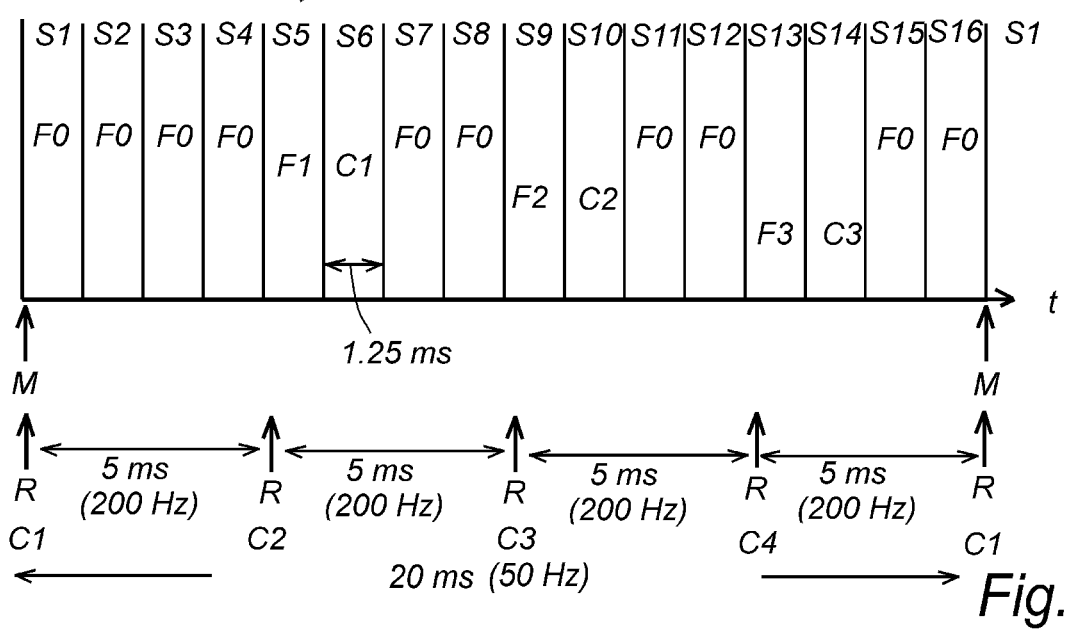
Fig. 1
Fig. 2

METHOD AND DEVICE FOR SYNCHRONIZING A DIGITAL PHOTOGRAPHY CAMERA WITH ALTERNATIVE IMAGE CONTENT SHOWN ON A PHYSICAL DISPLAY

CROSS-REFERENCE TO RELATED APPLICATIONS

This application is the U.S. national phase entry under 35 U.S.C. § 371 of International Application No. PCT/EP2019/074543, filed Sep. 13, 2019, entitled METHOD AND DEVICE FOR SYNCHRONIZING A DIGITAL PHOTOGRAPHY CAMERA WITH ALTERNATIVE IMAGE CONTENT SHOWN ON A PHYSICAL DISPLAY, which in turn claims priority to and benefit of European Application No. 18194374.7, filed Sep. 13, 2018 of which each is incorporated herein by reference in its entirety for all purposes.

The present invention concerns a method and a device for synchronizing a digital photography camera with alternative image content shown on a physical display.

Active displays, such as Light-Emitting Diode (LED) displays are widely used as billboards or signboards to convey information or advertisements to viewers. Typically, such displays are used in sports or entertainment events. Consequently, such displays often appear in television broadcasts (TV) or video streams which are directed to a large variety of different viewers, a typical example being viewers in different countries with different native languages or different cultural backgrounds. In order to target information/advertisements shown on these displays to specific sub-sets of these viewers, methods have already been developed to vary the content of a display between viewers observing the display via a television broadcast or a video stream.

It has been suggested to insert advertisements as an integral part of the video sequence, e.g., displaying the advertisement on a billboard shown in the video sequence. For instance, GB 2305051 describes an apparatus for an automatic electronic replacement of a billboard in a video image. However, in order to create a good impression and maintain a natural look of the composed image, the advertisement needs to be adapted to the rest of the scene in the video sequence. Typically, this approach requires human intervention to obtain results of good quality. Generally, these electronic or software-based approaches are often not satisfactory as far as viewer experience is concerned, especially when broadcast schemes involve dynamic scenes partially obscuring the billboard. In international patent application WO 2005/112476, a method has been described which allows variation of the content of a display between viewers in a television broadcast. This prior art document describes a method that enables multiple viewers to view one of several video streams simultaneously displayed on a single video display. However, the viewers are required to use shutter viewing glasses synchronized to one of the video streams shown on the display. Such a system is not suitable for television broadcasts of the display itself.

These problems are mitigated by a solution described in International Patent Application WO 2007/125350. This prior art document describes a method and a device for varying the content of a physical display which appears as part of a scene in a television broadcast between different viewers of the television broadcast. The display content comprises direct viewer display images directed to the viewers present at the event, for instance a sports event, and a broadcast viewer display images directed to the television viewers. The physical display displays two or more temporarily interleaved data content instances wherein the display image for the broadcast viewer is synchronized to show one of said data content instances. A camera is used to record a scene of the event including the physical display such as a signboard and a control system is used to synchronize the camera and the signboard. The video stream recorded by the camera which comprises all different data content instances is fed to a de-multiplexer which generates individual feeds corresponding to specific data content instances shown on the physical display. The method and system described in WO 2007/125350 requires dedicated camera technology which allows recording at frame rates which are much higher than the usual frame rate used for television or video broadcasts because the camera is required to capture each image displayed on the signboard. Also, the computing power of the de-multiplexer which generates the individual video feeds has to be correspondingly high. Thus, the method described in WO 2007/125350 requires new dedicated equipment and the corresponding costs for establishing such a technology at sports and entertainment events are high. Moreover, with the method of WO 2007/125350, the viewing experience of the direct viewers of an event is reduced because the insertion of dedicated images for the broadcast viewers results in an unsteady flickering of the signboard, even when the time intervals during which an image is shown, are too short for the viewer to consciously perceive an image content.

In International Patent Applications WO 2018/138366 A1 and WO 2018/138367 A1, the entire disclosures of which are herein incorporated by reference, describes a new technical system for transmitting alternative image content of a physical display to different viewers which can be based on existing camera and display technology thus allowing a new system to be readily and cost-effectively deployed in many sports and event arenas around the world and which improves the user experience both for viewers of the video stream and for the direct viewers of an event.

In these documents method and system for transmitting alternative image content of a physical display to different viewers is disclosed, comprising: generating at least two different sets of image data, each set of image data comprising a sequence of individual images; displaying the images of said at least two sets of image data in a time-sliced multiplexed manner on said physical display; generating at least one video stream of a scene which includes said physical display, said video stream consisting of video frames captured synchronously with the displaying of the images of one of said at least two sets of image data on said physical display; and transmitting said video stream to a sub-set of said viewers, wherein at least one set of image data comprises a sequence of images and inverse images. If one of the at least two different sets of image data shown on the physical display is intended to be viewed directly by a sub-set of viewers, e.g. visitors that are actually present in a sports stadium (direct viewers) while additional sets of image data are intended to be viewed as video streams by one or more different sub-sets of viewers (broadcast viewers). Thus, said at least two sets of different image data comprise one set of image data to be consciously viewed by one sub-set of users directly on said physical display (direct viewers). However, all image data shown on the physical display are effectively presented the direct viewers according to the method described in WO 2018/138366 A1, because the direct viewers will not employ any shutter glasses or the like which would block any images not intended for the direct viewers. Rather, the frame rates and display periods of the frames of the different sets of image data are selected such that the direct viewer can consciously only perceive the set of images which are intended for the direct viewer in accordance with the physiological constraints of the human eye. Other sub-sets of images intended to be transmitted via said video stream to be perceived by broadcast viewers only, are shown on the physical display with frame rates and image display periods selected such that they are not perceived by the human eye when looking directly onto the physical display while a video camera is still able to capture said images. At least one set of image data of said at least two sets of different image data, comprises a sequence of images and inverse images. The images of said set of image data comprising are intended to be transmitted via a video stream to a sub-set of viewers, i.e. for the broadcast viewers and should not be consciously by perceived by the direct viewers. The inverse images of said set of image data are not captured when generating the video stream but are displayed on the physical display shortly before or after the corresponding image, which is captured to generate the video stream. The time period between displaying an image to be captured and a corresponding inverse image should be short enough so that the images cannot be resolved by the human eye of the direct viewers of the physical display. Accordingly, the direct viewer perceives an average image of the image intended for the video stream and the corresponding inverse image so that intensity and/or color fluctuations experienced by the direct viewers of the physical display are reduced.

The inverse image of each preceding and/or subsequent image of a set of image data is generated in such a manner that the combined image and inverse image result in a perceived image for the direct viewers having a homogeneous intensity and/or a homogeneous grey value. Accordingly, it is possible that any intensity or color fluctuations for the direct viewers can be further reduced.

In one embodiment described in WO 2018/138366 A1, the at least one of said at least two sets of different image data can comprise a set of monochromatic image data. Accordingly, the method described therein can also be employed for software-based solutions (keying technology) where a monochromatic image on a physical display is used to identify the location of the physical display within an environment and to replace the monochromatic image via suitable image processing technology by the content to be viewed by the viewers of the video stream. In this embodiment, the inverse image can be generated on the basis of the monochromatic image data. Thus, in contrast to conventional keying technologies, where colored flashes are perceived by the direct viewers, the introduction of corresponding inverse images avoids any annoying distraction of the direct viewers.

In another embodiment described in WO 2018/138366 A1, the set of image data for the direct viewers is presented at a higher frame rate than the set (or each of the sets) of image data for the broadcast viewers. It is known from physiology, that the so-called "flicker fusion threshold" (or flicker fusion rate), the frequency at which an intermittent light stimulus appears to be completely steady to the average human observer, is—amongst other parameters, by the frequency of the modulation, the amplitude or depth of the modulation (i.e., what is the maximum percent decrease in the illumination intensity from its peak value) and the average (or maximum) illumination intensity (Ferry-Porter law). Accordingly, while the image data for the direct viewers are repeatedly interrupted by image data for broadcast viewers, flicker can be reduced when image data for direct viewers are shown at a higher frequency on the physical display. Accordingly, for a given frame rate, each frame of image data for direct viewers can be displayed multiple times on the physical display, for instance, each frame of image data for the direct viewers can be shown in multiple time slots before and/or after each frame of image data for the broadcast viewers.

In many events where the billboard displaying technology of WO 2018/138366 A1 or WO 2018/138367 A1 is employed, not only video streams for different sub-sets of users are generated as described in those patent applications, but still photographs using digital photography cameras are also frequently captured. Often, professional photographers are present, taking photos for online or print media. Moreover, the regular audience of an event (i.e. the direct viewers mentioned above) will usually take photos using their mobile phone cameras or consumer digital photography cameras. In many photographs taken at such events, the physical display, for instance a LED billboard, on which the alternative image content is displayed, will be part of the image scene. However, as the physical display shows alternative image content by displaying different sets of image data in a time-sliced multiplexed manner on the physical display, the photographers have no possibility of knowing or controlling which images are shown on the physical display when they take their photos. For instance, a professional photographer may take a photo just at a moment where image content for a particular type of video broadcast viewers is shown, which is not compatible with the target audience of the photographer. For instance, many countries have implemented restrictions as far as advertisements for alcoholic beverages or cigarettes are concerned and photographers from those countries would like to avoid taking photos showing such images. Moreover, photos could be taken during time periods where an inverse image is shown on the physical display or during time periods in which the images shown on the physical display change from one set of image data to a different set of image data. In these instances, the representation of the physical display in the photos taken will be deteriorated, decreasing the quality of the photos as a whole.

It is therefore a technical problem of the present invention to provide a method and a system allowing photographers to ensure that photos taken at an event where alternative image content is displayed on physical displays show only well-defined and controlled image contents on said displays, when photos are taken.

This technical problem is solved by the method and device defined in the enclosed claims.

Accordingly, the present invention concerns a method for synchronizing a digital photography camera with alternative image content shown on a physical display comprising the steps of generating at least two different sets of image date, each set of image data comprising a sequence of individual images, generating a master-clock signal, displaying the images of said at least two sets of image data in a time-sliced multiplexed manner on said physical display triggered by said master-clock signal, generating a camera-synchronization signal on the basis of said master-clock signal, generating a camera-actuation signal for capturing at least one image with said digital photography camera, generating at least one shutter release signal for said digital photography camera on the basis of said camera-synchronization signal and said camera-actuation signal, and transmitting said at least one shutter release signal to a shutter control unit of said digital photography camera.

According to the method of the present invention, when the photographer desires to take one or more images, the photographer will generate a camera-actuation signal by pressing or activating a suitable button, for instance, an actuation button of a remote control or an actuation button of the camera itself. In a normal camera operating mode, the camera-actuation signal will trigger the shutter release signal so that a photo can be taken. The term "shutter" does not merely refer to mechanical shutters as a, for instance, employed in DSLR cameras but also to electronic shutters as employed in consumer digital photography cameras are in the cameras of mobile phones. Even more broadly, the term "shutter release signal" refers to any internal camera signal which triggers the capturing of a photo. When executing the method of the present invention, however, the camera will usually be switched from its normal operating mode to dedicated synchronization mode, implemented for instance in the firmware of the camera are in dedicated software application (app) of the camera, especially in the case of mobile phone cameras. In synchronization mode, the camera-actuation signal will not yet trigger the capturing of a photo. Rather, the shutter release signal for actually capturing a photo will not only be generated on the basis of the camera-actuation signal, but also on the basis of the camera-synchronization signal.

In one embodiment, the camera-synchronization signal can be directly based on the master-clock signal responsible for displaying the different sets of image data on the physical display. Based on the master-clock signal, it is possible to determine images of which set of image data are displayed on the physical display at a specific time. For instance, each pulse of the master-clock signal triggers a sequence of images belonging to different sets of image data to be displayed on the physical display, where a specific time-shift with respect to the master-clock pulse corresponds to an image of a specific sub-set of image data. For instance, in one embodiment, image data intended to be consciously viewed by the direct viewers are displayed in synchronization with the master-clock pulse. Consequently, for photographers wishing to capture a scene where this particular set of image data is displayed on the physical display, the shutter release signal could be a signal obtained by a cross-correlation of the camera-synchronization signal (which can be the master-clock signal itself) and the camera-actuation signal.

If other sets of image data should be visible on the captured photo, the shutter release signal could be a cross-correlation of are camera-synchronization signal, which is time-shifted with respect to the master-clock signal, and the camera-actuation signal.

As both, the camera-synchronization signal, or in cases where the master-clock signal is directly used as a camera-synchronization signal the master-clock signal itself, and the camera-actuation signal, are preferably simple square pulses, a "cross-correlation" in the sense of the present invention could be merely determining whether a camera-actuation signal and a camera-synchronization signal/master-clock signal or a time-shifted camera-synchronization signal are present at a given time. If this condition is true, a shutter release signal will be generated and a photo will be captured by the digital photography camera in accordance with the settings of the camera.

Preferably, said shutter release signal is generated only for times at which both as camera-actuation signal (or the master clock signal itself) and a camera actuation signal are active.

In this embodiment, the digital photography camera will capture images on the physical display which are displayed synchronously with the camera-synchronization signal. It is, however, also possible to capture images displayed between master-clock signals, i.e. images corresponding to a different image feed. To this effect, the camera-actuation signal can time-shifted for a predetermined time interval with respect to the master-clock signal before said shutter release signal is generated. The predetermined time interval will be determined according to the image feed selected by the photographer.

Alternatively, shutter release signal can be time-shifted for said predetermined time interval before being transmitted to said shutter control unit. Such a feature can, for instance a, be implemented in the firmware of the camera.

In one embodiment multiple shutter release signals are generated for each camera-actuation signal allowing shooting of serial photos to be triggered by the shutter release signals. It is also possible to generate only one shutter release signal for each camera-actuation signal.

According to the present invention, the camera-synchronization signal is "generated on the basis of the master-clock signal". This term has to be construed broadly, not only a covering embodiments as described above where the master-clock signal itself provides a direct basis for generating the camera-synchronization signal. Rather, this term also covers indirect schemes for generating the camera-synchronization signal.

For instance, the master-clock signal can be used to trigger dedicated LEDs, especially infrared LEDs, which can be arranged on the physical display itself or elsewhere within the typical field of view of a photographer. Accordingly, the camera-synchronization signal can be generated by recording the LED-signals via the digital photography camera itself or via a dedicated sensor attached to the digital photography camera. Accordingly, no wiring is required to transmit trigger signals to the digital photography camera. Especially when the digital photography camera itself is used to record the trigger LEDs, no additional equipment is required on the camera side but generation of the camera-synchronization signal from the recorded LED-signal can be implemented in software (firmware or software application).

In other embodiments, the sets of image data shown on the physical display can be employed to generate the camera-synchronization signal. For instance, the recording of the physical display by the digital photography camera will generate a characteristic modulation on the sensor of the digital photography camera which is based on the master-clock frequency. Accordingly, using image processing software, the master-clock frequency can be derived from intensity changes recorded with the image sensor of the digital photography camera. For instance, if the digital photography camera uses rolling shutter technology, rotation of the camera will result in easily detectable intensity moderations. For global shutter digital photography cameras, a suitable detection method involves taking photos at a high frequency and deriving the master-clock frequency via image processing of differential images.

Many digital photography cameras include internal clocks, typically quartz-based clocks, which are sufficiently stable so that synchronization with the master-clock only has to be achieved once or twice during a typical sports event. Accordingly, synchronization only has to be achieved before the event and optionally during breaks of the event. To this effect, the digital photography camera can be linked via wire or wirelessly to the master-clock. Alternatively, dedicated image sequences which are based on the master-clock can be shown before the event or in breaks of the event which can be analyzed by an image processing software of the digital photography camera in order to synchronize its internal clock to the master-clock. After initial synchronization, the camera-synchronization signal will be generated on the basis of the internal clock which maintains synchronicity with the master-clock for tens of minutes or even hours.

The present invention also concerns a device for synchronizing a digital photography camera with alternative image contents shown on a physical display, comprising
  a first input for data based on an external master-clock signal,
  a second input for a camera-actuation signal,
  a processing unit for generating camera-synchronization signal on the basis of said data based on an external master-clock signal, and for generating at least one shutter release signal for said digital photographic camera on the basis of said camera-synchronization signal and said camera-actuation signal, and
  an output for transmitting the shutter release signal to a shutter control unit of said digital photography camera.

In accordance with the present invention, "data based on an external master-clock signal" can be any kind of data/signal which are directly or indirectly based on the master-clock signal, as described above. These "data" include the master-clock signal itself, the image sequences displayed on the physical display, dedicated LED signals, dedicated synchronization image sequences displayed on the physical display, etc.

In one embodiment, the device of the present invention is a separate box or housing, which can be fitted to any suitable digital photography camera having an input for shutter release signals. For instance, suitable digital photography cameras can be DSLR (digital single-lens reflex) cameras or DSLT (digital single-lens translucent) cameras, as well as consumer cameras such as "point and shoot-cameras" or cameras of mobile phones. While such as a separate box or housing can be dedicated box housing linked to a specific digital photography camera, it is preferred that such separate boxes and housings be used with digital photography, rest having an internal clock so that synchronization is only effected with said box/housing once or twice during a sports event while synchronization is maintained by the internal clock during the event so that the digital photography camera can be used without additional equipment during the event.

The cameras suitable in the context of the present invention can work with rolling shutter or global shutter technology.

The camera-actuation signal can be generated by a conventional camera remote control. In another embodiment, an actuation button can be integrated in the device itself. Consequently, the input for the camera-actuation signal would be an internal input transmitting the camera-actuation signal from the actuation button to the internal processing unit of the device.

The input and output of the present invention could be wire-based or wireless, in the latter case using, for instance, Bluetooth (IEEE 802.15.1), WLAN (IEEE-802.11) or infrared (e.g. IrDA) signal transmission technology. Specifically, the "first input" can be any suitable kind of input for receiving data based on an external master-clock signal, such as a wire-based electrical input, a receiver for wireless signals, and optical sensor, specifically the optical sensor of the digital photography a camera itself, etc.

In one embodiment, the device of the present invention is integrated in the digital photography camera so that the integrated release button of the camera itself could be used. Likewise, the device of the present invention could be integrated in a battery grip which is conventionally used with professional camera systems. When integrated into the digital photography camera, the device of the present invention can be implemented with components already present in commercially available digital photography camera without requiring additional physical modification of the camera. Specifically, the processor of the digital photography camera can be used as the "processing unit" of the claimed device, with the method of the present invention being implemented in software in the camera. Also, hardware or software controls of the digital photography camera can be used to control the method of the present invention. For instance, typical DSLR or DSLT cameras are provided with thumb wheels, which can be re-programmed to acting as controls for selecting the desired set of image data shown on the physical display which should appear on the captured photos and/or re-programmed to correcting any drift of synchronization during time periods when only the internal clock of the camera is used to generate the camera-synchronization signal.

In the sense of the present application, a "set of image data" corresponds to the images (be it still images or a film) shown to one particular sub-set of viewers. According to the present invention, at least two sets of image data are shown on the physical display while at least one video stream comprising one set of said two sets of image data is generated. In its most simple form, the method of the present invention comprises one set of image data intended for direct viewers of an event, e.g., viewers actually present at a sports or entertainment event. The second set of image data is directed to viewers of a video stream. More generally spoken, if the sets of image data shown on the physical device include image data for direct viewers, the number of generated video streams corresponds to the number of sets of image data minus one.

In one embodiment of the invention, the device comprises a feed selector which determines the predetermined time interval for which the master-clock signal or the shutter release signal will be shifted.

In one embodiment of the invention, at least on set of image data comprises a sequence of images and inverse images.

In one embodiment of the present invention, a "set of image data" may also include blank images, i.e. time intervals, where no image is displayed on the physical display. This may, for instance, be desired if the direct viewers of an event or participants of an event, such as soccer or basketball players, shall not be distracted by contents shown on the physical display, i.e. by advertisements, which are in this embodiment only transmitted to the broadcast viewers via the video screens.

In another embodiment of the invention, the "set of image data" may comprise monochromatically colored frames which can be used to identify the location of the physical display within a video stream in order to insert desired advertisements in the area of the physical display in the video stream using conventional, software-based keying technologies.

According to a further preferred embodiment of the invention, the physical display is a light-emitting diode (LED) array/display. Preferably, the LED display is a signboard or a billboard.

According to a further embodiment of the invention, the scene which is recorded in one or more video streams, is part of a sports event or an entertainment event.

In the following, a preferred embodiment of the present invention will be described in more detail making reference to the enclosed drawings. In the drawings, FIG. 1 shows a schematic overview of a system for synchronizing a digital photography camera with alternative image content shown on a physical display according to a first embodiment of the present invention;

FIG. 2 shows an exemplary image sequence for reducing flicker on the physical display of FIG. 1;

The present invention is now described in more detail with reference to a typical example, namely a television broadcast of a sports event.

Although the examples described in this application relate to a standard frame rates of 50 Hz (reflecting powerline frequency and PAL broadcasting specifications in Europe, Asia, Australia and parts of Southern America), it is evident for a person skilled in the art, that the concepts described here can also be applied to other standard frame rates, e.g. 25 Hz or 60 Hz (based on powerline frequencies in Northern/Central America and parts of Asia) or even fractional frame rates such as the 59.94 Hz frame rate of the NTSC broadcasting system.

Figure 5:
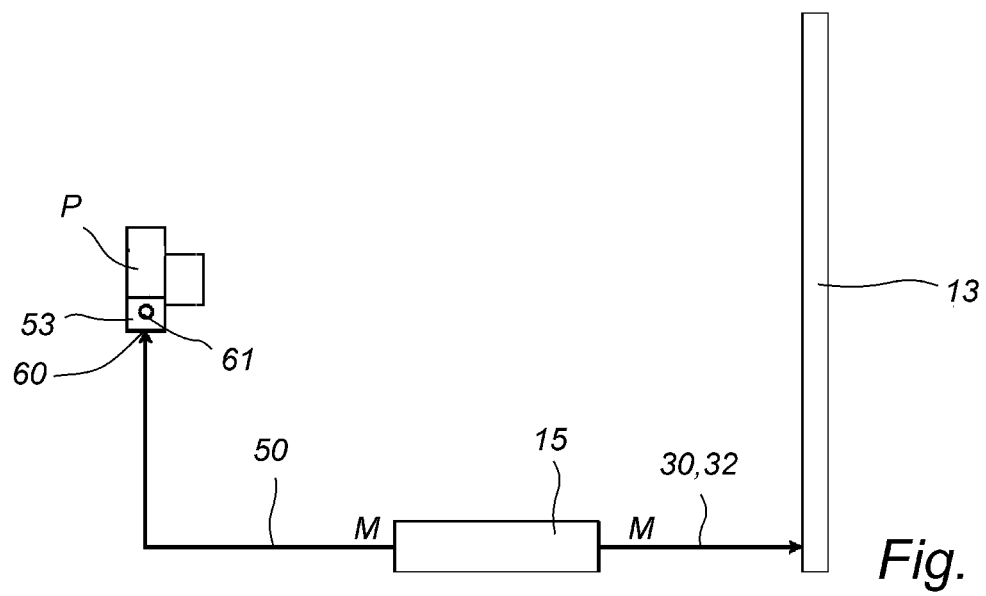
FIG. 5 shows yet a further embodiment of the invention for synchronizing a digital photography camera.
Figure 6:
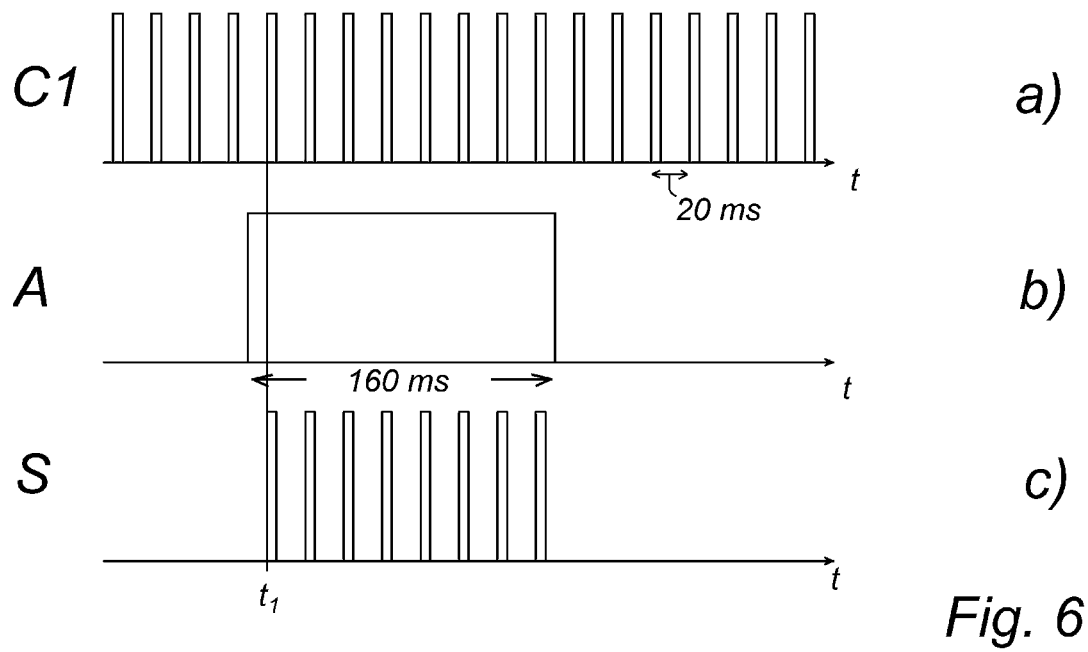
FIG. 6 shows a signal scheme for capturing one set of image data on the physical display of FIG. 1.

FIG. 1 schematically depicts a first exemplary embodiment of the present invention in a schematic view. A video camera unit VC is used to provide video footage of a sports event exemplified by a (partly depicted) soccer playing field 10. At a side line 11 of the playing field 10, an advertisement billboard 12 having an LED display 13 is installed. The advertisement billboard 12 comprises a controller 14 which controls delivery of still and/or animated images to the LED array 13. The video camera unit records an initial high frame rate video stream of a scene which includes the LED display 13 of the advertisement billboard 12. A typical video camera unit VC which can be employed in the present embodiment is a HDC 4300 camera commercialized by Sony Corporation which allows recording a scene with a high frame rate. The high frame rate video stream HFR (c.f. FIG. 5) is transmitted via a first optical cable 20 to a first connect 21 of an intermediate processing unit 22. The intermediate processing unit 22 comprises an information bridge 23 to connect the first connect 21 to a second connect 24 which can be used to connect the intermediate processing unit 22 via an second optical cable 25 to a camera control unit (CCU) 26. The camera control unit 26 has additional inputs/outputs 28 for signals such as external camera controls, tally, prompter, return video, etc. A suitable intermediate processing unit 22 is, for instance a baseband process unit (BPU), such as the BPU 4000 commercialized by Sony Corporation. The intermediate processing unit 22 further comprises a video processor 27 for converting and routing the initial high frame rate video stream to a plurality of physical SDI outputs O1, O2, O3, etc. The SDI outputs O1, O2, O3, etc. provide normal frame rate video streams NFR (c.f. FIG. 6).

The camera unit VC receives a master clock signal M from a master clock 15 either directly (not depicted) or via a line 29 connecting the master clock 15 to the camera control unit 26 and optical cables 25, 20.

The master clock signal M is also fed to an interface 17 via line 30. The interface 17 receives image data via image data input 31 and generates trigger signals T according to which the image data are transmitted via line 32 to the LED display 13 where the image data are shown in accordance with the trigger signals T. The trigger signals T are selected such that subsequent frames recorded by the camera unit can show the recorded scene with different image data shown on the LED display 13. As a matter of course, the image data can also be transmitted pre-stored in a storage medium of the display 13 and/or of the interface 17. Moreover, the interface 17 can be part of the advertisement billboard 12 so that line 32 is part of the internal circuitry of billboard 12.

FIG. 1 shows a first embodiment implementing the method of the present invention for synchronizing a digital photography camera P with alternative image content shown on the physical display (LED display) 13. In the embodiment of FIG. 1, the master-clock signal M is also transmitted via line 50 to a digital photography camera P. A remote control 51 is used to generate a camera-actuation signal A, which is transmitted via line 52 to a digital photography camera P. Digital photography camera P comprises an input unit 53 having a first input 54 adapted to receive the external master-clock signal M via line 50 and a second input 55 adapted to receive the camera-actuation signal via line 52.

In this embodiment, the processing unit for generating the shutter release signal is integrated in the digital photography camera P.

Alternatively, digital photography camera P can be synchronized via infrared LEDs 16 embedded in the advertisement billboard 12 and/or dedicated infrared LEDs 17 arranged near the playing field 10. The trigger signals of the infrared LEDs a can be captured by the digital photography cameras P without disturbing the viewers present at the sports event.

FIG. 2 shows a preferred scheme for presenting image data and inverse image data on the LED display 13 in a manner which reduces flicker for the direct viewers to a minimum. This scheme is described in WO 2018/138366 A1 in more detail.

The embodiment of FIG. 2 is based on the assumption that the normal frame rate of video screens transmitted with the method of the present invention corresponds to 50 Hz. In this embodiment, four different sets of image data are employed: One set of image data (feed F0) is intended to be consciously viewed by the direct viewers. Three additional feeds (F1, F2, F3) are intended to be consciously viewed by broadcast viewers only. In the depicted embodiment, the image data of feed F0 are also transmitted to a sub-set of broadcast viewers. Accordingly, a camera VC (or cameras) allowing to capture video at a frame rate of 200 Hz are employed, so that four different frames (one image frame for each video screen to be transmitted) can be captured by the camera within the time period of 20 ms of the 50 Hz standard frame rate.

In order to reduce influence on of the perception of feed F0 by the direct viewers to a minimum, it is suggested in WO 2018/138366 A1 that each frame intended to be viewed by broadcast viewers only is followed by a frame depicting an inverse image. However, a frame rate of 50 Hz, the feed F0 intended to be consciously viewed by the direct viewers, is still prone to flickering.

The scheme described in FIG. 2 allows to minimize flickering of the images presented to the direct viewers by increasing the perceived frame rate of images of the set of images of feed F0 presented to the direct viewers. As shown, each frame of image data for the direct viewers is shown in multiple times slots before and after each frame of image data for the broadcast viewers. In the embodiment of FIG. 2, the time period of 20 ms of the standard frame rate 50 Hz, i.e. the time period between two pulses of master-clock M (see arrows "M") is subdivided into 16 time slots denoted slots S1, S2, S3, S4 . . . , S15 and S16. Accordingly, each time slot has a length of 1.25 ms and 4 time slots make up a period of 5 ms, i.e. the 200 Hz frame rate of the camera employed in the embodiment. Accordingly, the image data of feed F0 intended to be consciously viewed by the direct viewers is presented in time slots 51, S2, S3, S4. Time slot S1 is likewise a time slot recorded by the camera. The time slots in which video camera recording is active are denoted by symbol "R" in FIG. 2. In time slot S5, an image frame of feed F1 intended for the broadcast viewers only is depicted on the physical display 13 and is also recorded by the camera (see symbol "R). Time slot S6 shows the complimentary/ inverse image C1 of the image of feed F1 and is not recorded by the camera. However, for the direct viewers, the rapid combination of frames F1 and C1 results in a hardly perceivable grey image which does not disturb the perception of the main feed F0 intended for the direct viewers. Now, in slots S7 and S8, two frames of feed F0 are presented again before image data F2 and complimentary image data C2 are presented in Slots S9 and S10. Slots S11 and S12 again depict image data of feed F0 while slots S13 and S14 show image data F3 and complimentary image data C3 of the third feed for broadcast viewers. Slots S15 and S16 are then again dedicated to feed F0 for the broadcast viewers.

Accordingly, the image data of feed F0 intended to be viewed by the direct viewers are presented at a higher frame rate, thus minimizing any flickering.

It is of further advantage if the intensities of image data presented to the direct viewers (F0) are higher than the intensities of the images presented to the broadcast viewers (F1, F2, F3) in order to reduce the minimum intensity shown on the physical display 13 to a dark grey/almost black value (assuming that the sensitivity of the cameras employed is sufficiently high). This will also reduce any distortion of the perception for the direct viewers even more. In such an embodiment, it is also possible to reduce the intensities of the image presented in slot 51 to the same level as the intensities of the images intended for the broadcast viewers, so that no special camera adaption is required for the video stream based on feed F0. The reduction of the intensity in one slot out of 10 slots having image data for the direct viewers still does not noticeably affect the overall intensity perceived by the direct viewers.

As a matter of course, similar schemes can be devised for different standard frame rates such as 25 Hz or 60 Hz.

Figure 3:
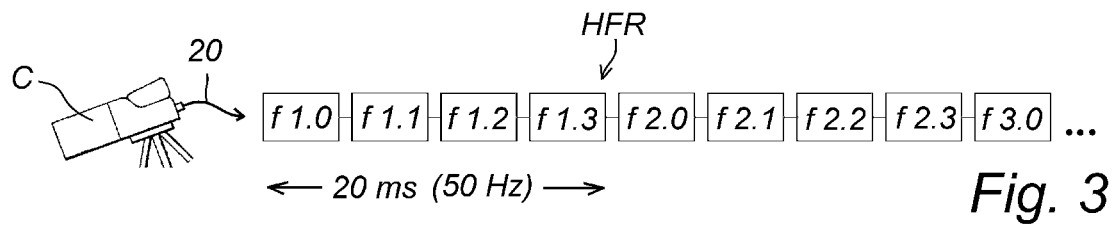
FIG. 3 shows a frame sequence of a single camera unit used in the embodiment of FIG. 1.

Based on the image scheme of FIG. 2, FIG. 3 shows a sequence of frames of a high frame rate video HFR recorded by the camera unit VC with four times of a normal frame rate (50 Hz), i.e. with 200 Hz. Accordingly, four frames denoted f i.0, f i.1, f i.2 and f i.3 corresponding to the feeds F0, F1, F2 and F3, respectively, are recorded during each time interval i of 1/50 sec. (20 ms). The frames are transmitted via the optical cable 20 to the intermediate processing unit 22 (BPU). Accordingly, within the first recording period of 20 ms, the first frames of each feed are recorded, i.e. f 1.0 (corresponding to slot S1 in FIG. 2), f 1.1 (slot S5), f 1.2 (slot S9) and f 1.3 (slot S13), respectively. In the following 20 ms period, the second frame of each channel is recorded, i.e. f 2.0, f 2.1, f 2.2 and f 2.3, respectively, and so on. In the intermediate processing unit 22, the HFR video stream is routed to SDI outputs O1, O2, O3, O4 in such a manner that the captured images of each feed F0, F1, F2 and F3 are allocated to a dedicated SDI output, e.g. feed F0 to output O1, feed F1 to output O1, feed F2 to output O3 and feed F3 to output O4 as normal frame rate video streams (see in WO 2018/138366 A1 for details).

Figure 4:
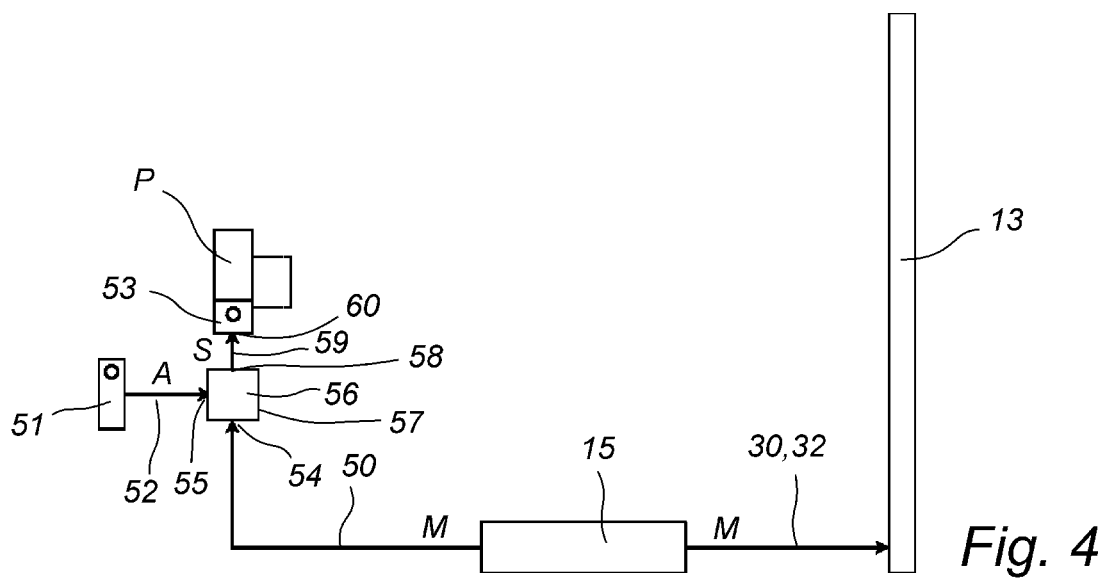
FIG. 4 shows an alternative embodiment of the invention for synchronizing a digital photography camera.

FIG. 4 shows an alternative embodiment for implementing the method of the present invention where a dedicated processing unit 56 having a housing 57 is used to receive the master-clock signal via line 50 and the camera-actuation signal via line 52 from a dedicated remote control 51. For the sake of simplicity, components relating to the video stream generation and interface 17 have been omitted in the drawing. The processing unit 56 for generating the shutter release signal is integrated in the housing 57. Accordingly, signal inputs 54, 55 for master-clock signal M and camera-actuation signal A, respectively, are now located at the housing 57 of the processing unit 56 which is further provided an output 58 for transmitting a shutter release signal S generated by the processing unit 56 via line 59 to an input 60 of input unit 53 of digital photography camera P. The scheme of FIG. 4 can be employed for any commercially available camera which is provided with an input 60 for a remote control signal. The processing unit 54 can be employed to configure the shutter release signal S in any manner suitable to trigger the shutter of conventional cameras.

FIG. 5 schematically describes a further embodiment of the present invention where the internal camera actuator 61 is used to trigger the camera-actuation signal. Accordingly, the input unit 53 of digital photography camera P has only to be adapted to receive the master-clock signal M via line 50 at input 60.

Figure 7:
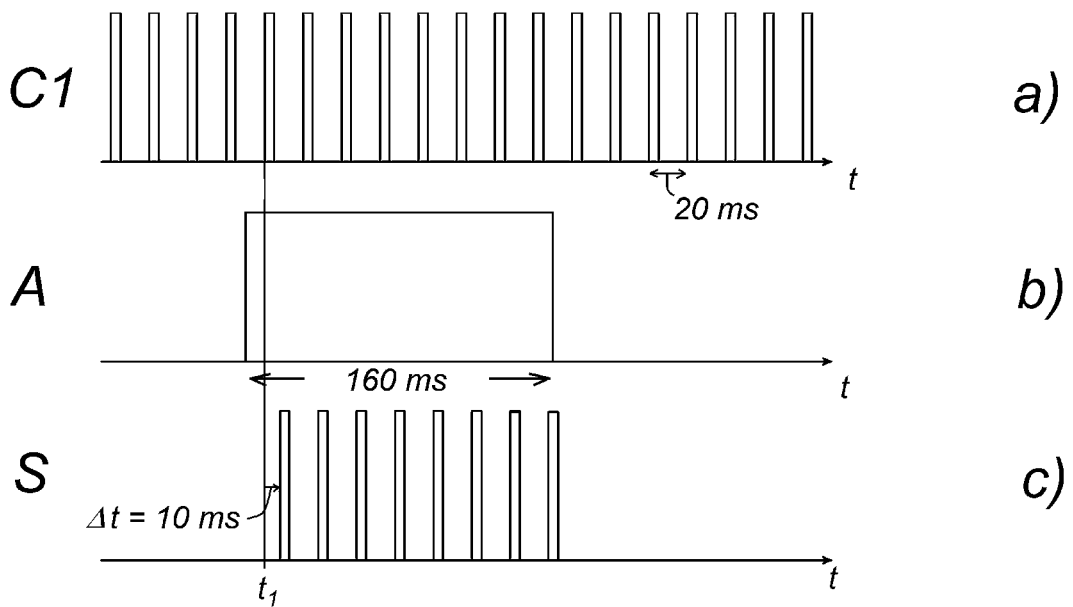
FIG. 7 shows a signal scheme for capturing a different set of image data.

FIGS. 6 and 7 depict signal sequences for capturing photos with a digital photography camera P according to the method of the present invention. In these examples, we assume that the images on the physical display 13 are generated according to the scheme of FIG. 2. Accordingly, the trigger signals R which are used to trigger video camera recording can also be used as (or can correspond to) camera-synchronization signals C1, C2, C3 and C4 for the digital photography camera P. In the specific scheme of FIG. 2, it has to be noted that not all camera-synchronization signals shown therein are suitable for any type of digital photography camera. For instance, in order to reliably capture a photo of an image shown on the billboard display 13, rolling shutter digital photography cameras usually require image frame durations of around 3.3 ms. In the scheme of FIG. 2, this condition is only met at camera-synchronization signal C1, because the images of feed F0 are shown in four consecutive slots S1 to S4, corresponding to an image frame duration of 5 ms. In contrast, the images corresponding to camera-synchronization signals C2, C3 and C4 are only shown in one slot of 1.25 ms duration, each. For capturing photos of these frames, one should preferably resort to global shutter digital photography cameras.

For the purpose of the example shown in FIG. 6, we assume that only photos of the main feed F0 shall be taken by digital photography camera P. Accordingly, FIG. 6a shows the corresponding camera-synchronization signal C1 comprising square pulses separated by time intervals of 20 ms. Accordingly, the time interval between two square pulses in FIG. 6a corresponds to the 20 ms period depicted in FIG. 2.

FIG. 6b depicts a camera-actuation signal A of approximately 160 ms duration generated, for instance, by remote control 51 of FIGS. 1 and 4 or by the actuation button 61 of the camera P of FIG. 5.

Implementing the method of the present invention, the processing unit generates the shutter release signal S of FIG. 6c. In the example depicted in FIG. 6, the shutter release signal S is a cross-correlation of camera-synchronization signal C1 and camera-actuation signal A, resulting in eight square pulses, which could be used to trigger a series of eight photos, each photo being timed to capture only the images of the main feed F0 of the sequence of FIG. 2. As indicated by time line $t_1$, the pulses of the shutter release signal S are synchronous with the pulses of the camera-synchronization signal C1, which are, as described above, can be the master-clock signal M itself. If the scheme of FIG. 2 is used, it is evident that the exposure time can be extended beyond a slot period of 1.2 ms up to 4.8 ms, because in this scheme, the first four slots show the same image, namely the image of the main feed F0. It is also evident that the processing unit can be configured such that only one pulse is created for each shutter release signal A.

FIG. 7 depicts an alternative embodiment of the processing scheme of FIG. 6. In this embodiment, the processing unit is configured to shift the incoming camera-synchronization signal C1 by a time interval Δt of 10 ms, so that upon cross-correlation, the resulting shutter release signal S is also shifted by a corresponding time interval Δt (see time line $t_1$). Accordingly, assuming that the physical display is triggered with the scheme of FIG. 2, the digital photography camera P would not capture the main feed F0, but images of the second feed corresponding to slot F9. It is also evident that the exposure time would have to be limited to 1.25 ms in this embodiment, because the preceding and following image slots F8 and F10, respectively, show different images which should not be captured by the digital photography camera P.

The invention claimed is:

1. Method for synchronizing a digital still photography camera with alternative image content shown on a physical LED signboard or LED billboard which is installed at a sports event or an entertainment event and appears as part of a scene in a video stream of the event, comprising:
   generating at least two different sets of image data, each set of image data comprising a sequence of individual images;
   generating a master-clock signal (M);
   displaying the images of said at least two sets of image data in a time-sliced multiplexed manner on said physical display triggered by said master-clock signal (M), wherein at least one set of image data is intended for direct viewers present at the event and at least one set of image data is intended for broadcast viewers;
   generating a video stream using a video camera unit synchronized with the displaying of said images of said set of image data intended for broadcast viewers;
   generating a camera-synchronization signal (C) on the basis of said master-clock signal (M),
   generating a camera-actuation signal (A) for capturing at least one image with said digital photography camera;
   generating at least one shutter release signal (S) for said digital still photography camera on the basis of said camera-synchronization signal (C) and said camera-actuation signal (A); and
   transmitting said at least one shutter release signal (S) to a shutter control unit of said digital still photography camera.

2. The method of claim 1, wherein said shutter release signal (S) is generated only for times at which both said camera-synchronization signal (C) and said camera-actuation signal (A) are active.

3. The method of claim 2, wherein said camera-synchronization signal (C) is time-shifted for a predetermined time interval with respect to the master-clock signal (M) before said shutter release signal (S) is generated.

4. The method of claim 2, wherein said shutter release signal (S) is time-shifted for a predetermined time interval before being transmitted to said shutter control unit.

5. The method of claim 1, wherein multiple shutter release signals (S) are generated.

6. The method of claim 1, wherein master-clock signal (M) and/or said camera-actuation signal (A) comprises square pulses.

7. A device for synchronizing a digital still photography camera with alternative image content shown on a physical LED signboard or LED billboard which is installed at a sports event or an entertainment event and appears as part of a scene in a video stream of the event, wherein at least one set of image data of said alternative image content is intended for direct viewers present at the event and at least one set of image data of said alternative image content is intended for broadcast viewers and said video stream is generated using a video camera unit synchronized with the displaying of said images of said set of image data intended for broadcast viewers, said device for synchronizing comprising:
   a first input for receiving data based on an external master-clock signal (M),
   a second input for receiving a camera-actuation signal (A),
   a processing unit for generating a camera-synchronization signal (C) on the basis of said data based on an external master-clock signal (M), and for generating at least one shutter release signal (S) for a digital still photography camera (P) on the basis of said camera-synchronization signal (C) and said camera-actuation signal (A), and
   an output for transmitting said shutter release signal (S) to a shutter control of said digital still photography camera (P).

8. The device of claim 7, wherein said first input, said second input for receiving a camera-actuation signal (A), said a processing unit for generating at least one shutter release signal (S) and said output are integrated in a separate housing which is externally connectable to said digital still photography camera (P) via said output.

9. The device of claim 7, wherein said first input, said second input (55) for receiving a camera-actuation signal (A), said a processing unit for generating at least one shutter release signal (S) and said output are integrated in said digital still photography camera (P).

10. The device of claim 9, wherein said second input is configured as an internal input receiving a camera-actuation signal (A) from an actuation button of said digital still photography camera (P).

11. The device of claim 7, wherein said second input is configured as an external input receiving a camera-actuation signal (A) from a remote control.

12. The device of claim 8, wherein said second input is configured as an internal input within said housing, receiving a camera-actuation signal (A) from an actuation button arranged on said housing.

* * * * *